No. 751,228. PATENTED FEB. 2, 1904.
R. H. VILLARD & H. P. COPELAND.
CABLE HANGER.
APPLICATION FILED AUG. 5, 1902.
NO MODEL.
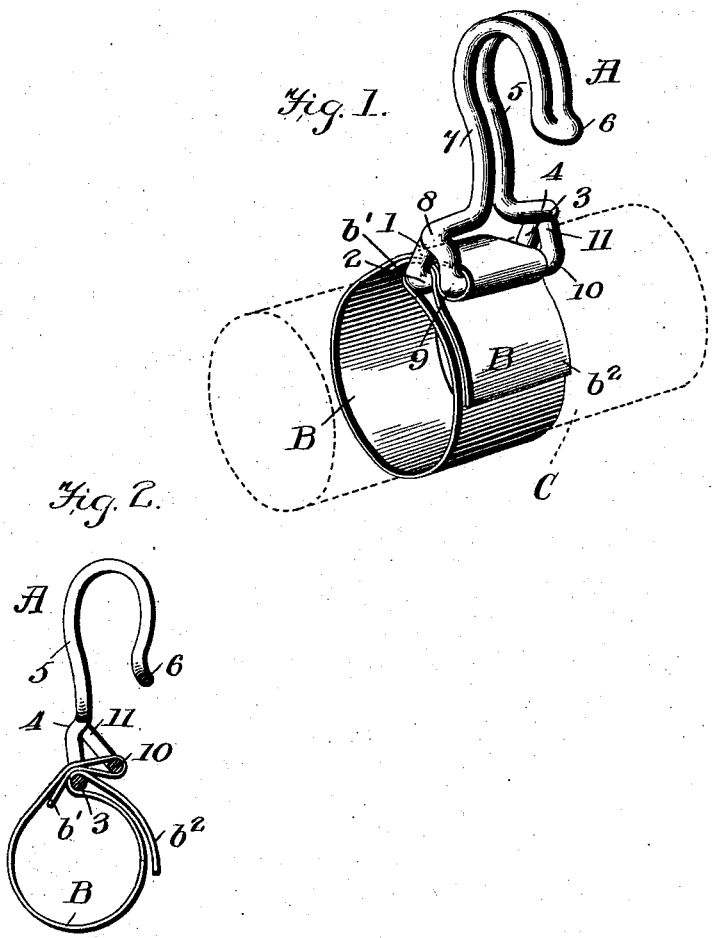

No. 751,228. Patented February 2, 1904.

UNITED STATES PATENT OFFICE.

RICHARD H. VILLARD, OF NEW YORK, N. Y., AND HERSCHEL P. COPELAND, OF JERSEY CITY, NEW JERSEY.

CABLE-HANGER.

SPECIFICATION forming part of Letters Patent No. 751,228, dated February 2, 1904.

Application filed August 5, 1902. Serial No. 118,548. (No model.)

*To all whom it may concern:*

Be it known that we, RICHARD H. VILLARD, residing at New York, in the county of New York and State of New York, and HERSCHEL P. COPELAND, residing at Jersey City, in the county of Hudson and State of New Jersey, citizens of the United States, have invented certain new and useful Improvements in Cable-Hangers; and we do hereby declare the following to be a full, clear, and exact description of the invention, such as will enable others skilled in the art to which it appertains to make and use the same.

Our invention relates to improvements in cable-hangers for use in suspending electric or other cables; and it consists of certain novel features, as will be hereinafter more fully described and claimed.

Reference is had to the accompanying drawings, in which the same parts are indicated by the same letters and numerals throughout both views.

Figure 1 is a perspective view showing one form of the hanger, the cable being indicated in dotted lines; and Fig. 2 represents a cross-section through the center of the device shown in Fig. 1.

A represents a combined hook and grip, B the strap, and C the cable. This hook and grip are made of a single piece of wire which, starting at 1, is bent at 2, led straight to 3, is then bent again at 4, and forms the hook at 5, 6, and 7, being bent downward again from 8 to 9, passing across to 10, and terminating at 11. The ends 1 and 11 may be soldered or otherwise secured to the body of the hook, if desired; but this is not necessary.

It will be seen that the parallel members 2 to 3 and 9 to 10 form a grip for the strap B, the ends $b'$ and $b^2$ of the said strap being rove, as shown in Fig. 2, and that the grip will hold firmly on the cable, while at the same time the cable will not be marred or indented. It will be obvious that the grip may be readily removed or readjusted when desired.

The hook is passed over the messenger-wire. (Not shown.)

The hook and grip are preferably made of one piece of steel wire, preferably galvanized, and the strap is preferably made of sheet-zinc.

In using the hook no lineman, with his carriage or saddle, is required to pass over the cable after the hooks are placed on the messenger-wire to readjust the hooks, as is usual with other hooks now most generally in use, and thus time, expense, and risk of life are saved in readjusting the hooks.

To apply, hold in the left hand, with the strap resting against the cable and the hook turned back. Pass the free end of the strap under the cable and through the grip, pulling it up as far as it will go, and then stand the hook in an upright position. The raising up of the hook causes the grip to draw on both ends of the strap at the same time from two opposite directions, thus firmly binding and locking the hanger in position and not allowing it to slip on the cable. Thus it will be seen that the two ends of the strap are then sharply bent about the parallel members 3 and 10, respectively, and that this sharp bend, combined with the friction of the strap on the cable, firmly attaches the hanger to said cable. The strap may be rapidly applied or adjusted and rapidly removed when desired.

Having thus described our invention, what we claim, and desire to secure by Letters Patent of the United States, is—

In a cable-hanger, the combination with a hook provided with a heel portion having parallel members 3 and 10 slightly spaced apart, of a strap B having one end $b'$ rove over and under one parallel member 10 and then between the parallel members 10 and 3, and having its other end $b^2$ rove under and then over the second parallel member 3 and projecting outward between the said parallel members 3 and 10, substantially as described.

In testimony whereof we affix our signatures in the presence of two witnesses.

RICHARD H. VILLARD.
HERSCHEL P. COPELAND.

Witnesses:
L. C. ELLIOTT,
K. C. HICKEY.